Nov. 7, 1939.  G. W. WHITEHURST  2,179,207
SAFETY CONTROL AND OIL LEVELING VALVE STRUCTURE
Filed Sept. 13, 1937  3 Sheets-Sheet 1
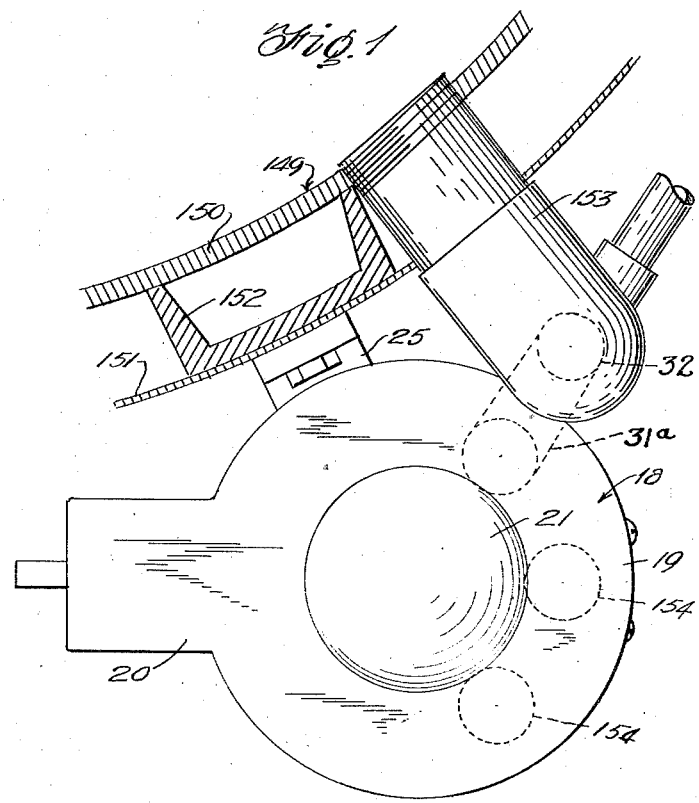
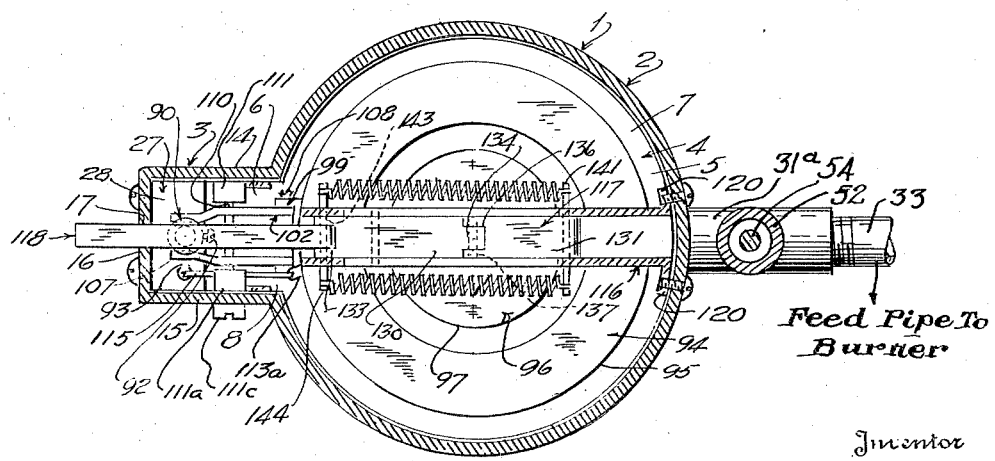
Inventor
GEORGE W. WHITEHURST,
By Kimmel & Crowell
Attorneys.

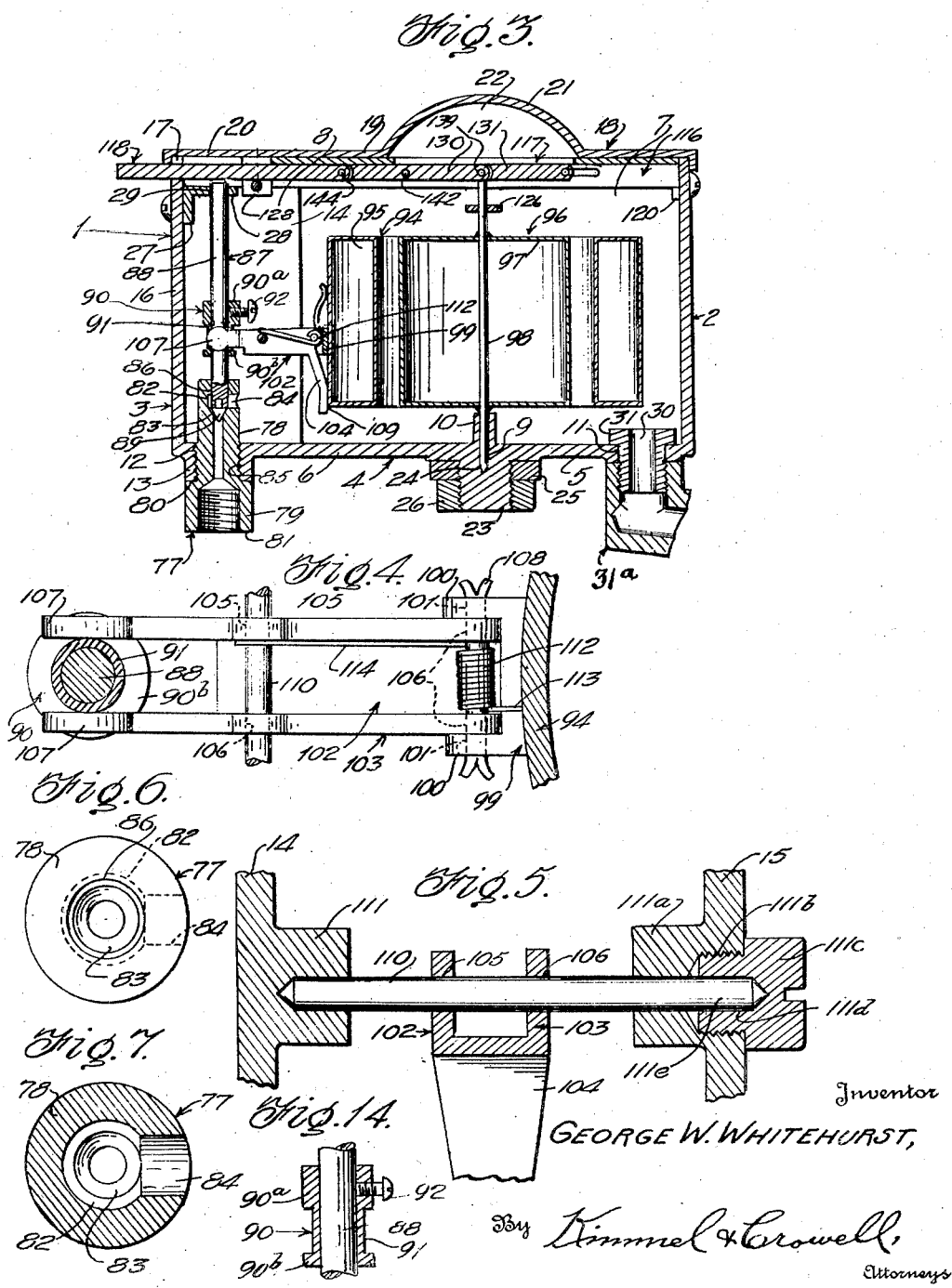

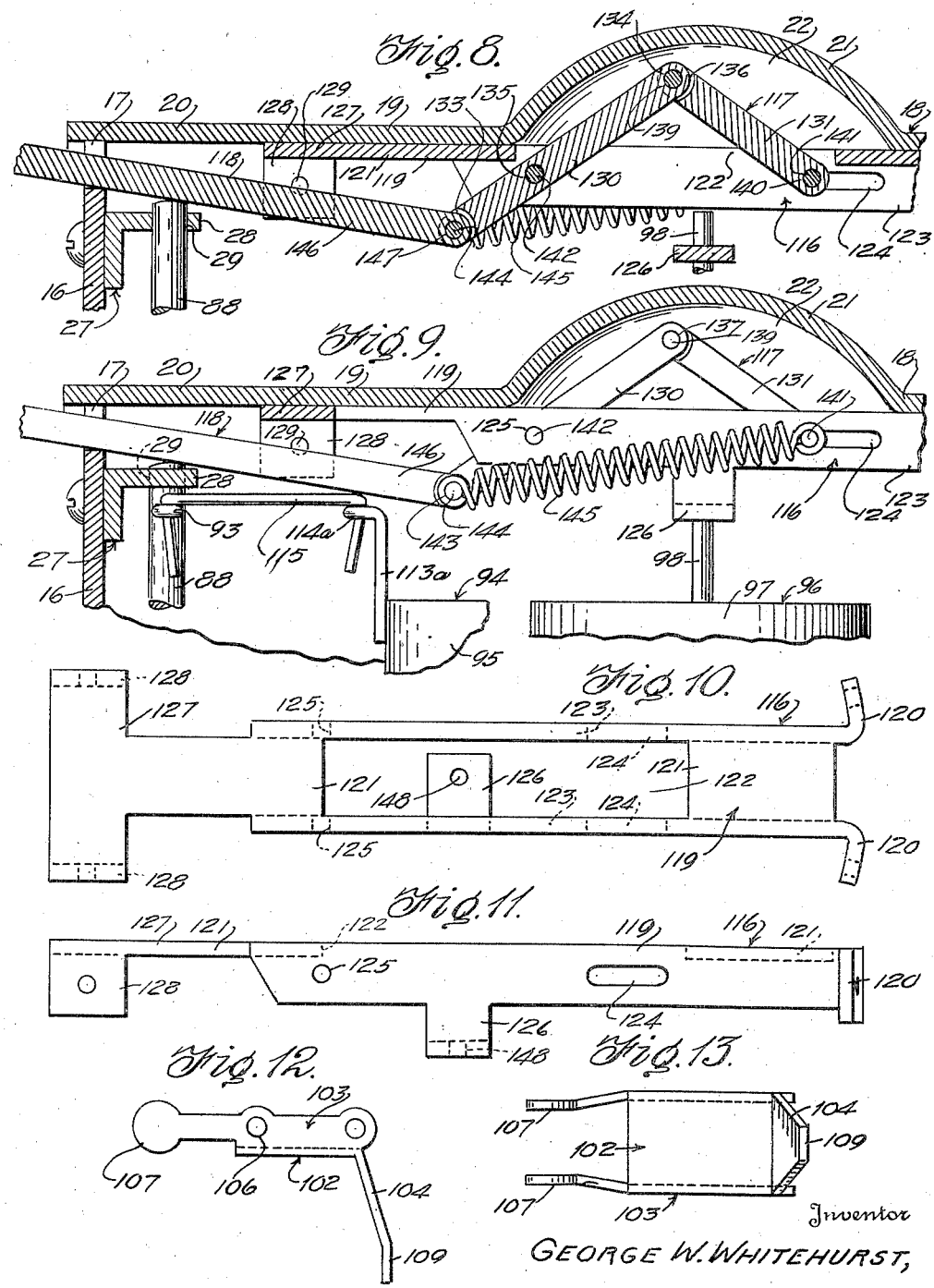

Patented Nov. 7, 1939

2,179,207

UNITED STATES PATENT OFFICE 2,179,207

SAFETY CONTROL AND OIL LEVELING VALVE STRUCTURE

George W. Whitehurst, Portsmouth, Va.

Application September 13, 1937, Serial No. 163,710

5 Claims. (Cl. 137—68)

This invention relates to a combined safety control and oil leveling valve structure for use in connection with the supplying of oil to oil burners.

The invention has for its object to provide, in a manner as hereinafter set forth, a structure of the type referred to including a float controlled intake valve, and means operated from the controlling float for the valve, when required, to cause an accurate seating of the valve when its seat has deposited thereon foreign matter from the inflowing oil.

The invention has for its further object to provide, in a manner as hereinafter set forth, a structure of the type referred to including an intake valve and means for imparting a rotative action to and a pounding action on said valve, when required to provide for the accurate seating of the latter in case foreign matter is deposited from the incoming oil on its seat, which otherwise would prevent an accurate seating.

A further object of the invention is to provide, in a manner as hereinafter set forth, a structure of the type referred to including an intake valve chamber having a valve controlled oil inlet above its bottom, a float chamber opening into the valve chamber and formed with a permanently opened oil outlet arranged above the bottom of the float chamber and below said inlet.

A further object of the invention is to provide, in a manner as hereinafter set forth, a structure of the type referred to including a combined intake and safety valve having associated therewith a manual or automatic control for seating it.

A further object of the invention is to provide, in a manner as hereinafter set forth, a structure of the type referred to including a safety cut off automatically operated to cut off position when the oil rises to a higher level than the level originally set.

A further object of the invention is to provide, in a manner as hereinafter set forth, a structure of the type referred to including an intake valve selectively and simultaneously controlled by a pair of float operated mechanisms, one slidably engaging with and the other normally free of the valve.

A further object of the invention is to provide, in a manner as hereinafter set forth, a structure of the type referred to including a combined intake and control valve capable of being reset without splashing out or removal of oil from the structure.

A further object of the invention is to provide, in a manner as hereinafter set forth, a structure of the type referred to including a combined intake and shut off valve having associated therewith a float controlled means to cause the seating of the valve to shut-off position by a very small amount of excess oil.

A further object of the invention is to provide, in a manner as hereinafter set forth, a structure of the type referred to including an intake controlling valve and independent float controlled means acting on the valve for cleaning the seat for the valve to cause an accurate seating of the latter when shifted to shut-off position when required.

Further objects of the invention are to provide, in a manner as hereinafter set forth, a structure for the purposes aforesaid which is comparatively simple in its construction and arrangement, strong, durable, compact, readily assembled, functioning in a manner to prevent overflow of oil, capable of being reset for oil feed controlling position without the necessity of dumping out oil previously supplied thereto, thoroughly efficient in its use, automatic in its action, and comparatively inexpensive to manufacture.

To the above ends essentially and to others which may hereinafter appear, the invention consists of the novel construction, combination and arrangement of parts as will be more specifically described and illustrated in the accompanying drawings wherein is shown an embodiment of the invention, but it is to be understood that changes, variations and modifications may be resorted to which fall within the scope of the invention as claimed.

In the drawings:

Figure 1 is a top plan view of the safety control and oil leveling valve structure, in accordance with this invention and showing the adaptation thereof with a boiler and a thermostat, Figure 2 is a horizontal sectional view of the structure, Figure 3 is a vertical sectional view of the structure, Figure 4 is a fragmentary view in top plan and horizontal section illustrating the pressure applying element for the supply or intake valve, Figure 5 is a vertical sectional view illustrating the mounting for the element shown in Figure 4, Figure 6 is a top plan view of the combined valve seat forming an intake element for correlation with the intake or supply valve, Figure 7 is a horizontal sectional view of the element shown in Figure 6, Figure 8 is a fragmentary view in longitudinal section illustrating the pounder element for the intake or supply valve stem and the actuating means for said pounder element and with said element and means shown in active position, Figure 9 is a fragmentary view in longitudinal section of the upper portion of the structure and further showing in side elevation the pounder element and the actuating means for the latter in active position, Figure 10 is a top plan view of the support for the actuating means for the pounder element, Figure 11 is a side elevation of the support shown in Figure 10, Figure 12 is a side elevation of the pressure applying element for the intake or supply valve, Figure 13 is an inverted plan of the element shown in Figure 12, and Figure 14 is a sectional detail illustrating the setting device for the pressure applying means for the intake valve.

Referring to the drawings, the structure includes a housing 1 formed of an annular part 2 and a rectangular part 3 integral with each other. The part 3 corresponds in height and is disposed in lateral relation with respect to the part 2. The part 3 at its inner end opens into the part 2. The housing 1 includes a bottom member 4 which is common to and integral with the parts 2, 3. The member 4 is formed of a circular portion 5 and a rectangular portion 6. The portion 5 in connection with the part 2 provides an open top float chamber 7. The portion 6 in connection with the part 3 provides an open top intake valve chamber 8. The member 4 axially of its portion 5 is formed with an opening 9 and a vertically disposed integral sleeve 10 having its inner face forming an upward continuation of the opening 9. The said portion 5 is also formed in proximity to part 2 with an opening 11 of greater diameter than opening 9. The wall of opening 11 is plain. The member 4 has its portion 6 formed with an opening 12 and an integral depending collar 13 having its inner face forming a continuation of the wall of opening 12. The wall of the latter and the inner face of collar 13 are threaded.

The part 3 includes a pair of side walls 14, 15 and an outer end wall 16. The latter has its top edge formed with a notch 17 centrally thereof.

There is associated with the housing a flanged cover 18 of the same contour in plan as the housing 1. The cover 18 is formed of a circular part 19 and a rectangular part 20. The parts 19, 20 provide respectively closures for the chambers 7, 8. The part 19 is formed with an upstanding portion 21 of dome-shape contour to provide its lower face with a segmental-shaped pocket 22 providing a clearance for a purpose to be referred to.

Integral with the lower face of portion 5 of bottom member 4 is a flanged support 23 for a guide rod to be referred to. The support 23 is formed axially with a socket 24 opening at the upper end thereof and aligning with opening 9. The support 23 extends down through a horizontally-disposed supporting bracket 25 for housing 1. The support 23 is peripherally threaded and threadedly engaging therewith is a nut 26 for clamping it and the bracket together.

Secured to the inner face of wall 16 of chamber 8 in proximity to its upper end is an inwardly extending angle-shaped guide 27 for the stem of the supply valve stem to be referred to. The horizontal leg 28 of guide 27 has an opening 29 which is disposed in concentric alignment with the opening 12. Depending through the opening 11 is a peripherally threaded tubular coupling nipple 30 having a flange 31 at its upper end seated on the upper face of the portion 5 of bottom member 4. The nipple 30 acts to couple, with the circular portion 5 of the bottom of housing 1, the angle-shaped branch 31ᵃ of the housing 32 of an outlet valve mechanism 33 which forms no part of this invention and is conventionally shown.

Secured to the threaded wall of opening 12 and to the threads of collar 13, is a vertically disposed tubular casting 77 which extends above part 6 of member 4 and depends from collar 13. The casting 77 provides a controllable intake element for chamber 8, and it is formed of upper and lower parts 78, 79 respectively. The part 78 is of greater length than part 79. The outer and inner diameters of part 78 is less than that of part 79. The junction of the parts 78, 79 provides outer and inner shoulders 80, 81 respectively. The inner face of part 78 in proximity to its upper end is formed with an annular groove 82 and directly below the latter with a beveled portion 83 constituting a valve seat. The part 78 is formed with a horizontally disposed port 84 which leads from the groove 82 and opens into the lower portion of chamber 8. The part 78 on its outer periphery has threads 85 which engage with the threads on the wall of opening 12 and on the collar 13. The shoulder 80 abuts the bottom edge of collar 13. The part 79 is internally threaded for coupling an oil supply line (not shown) thereto which is to abut the shoulder 81. The latter is beveled. That portion of the inner face of part 78 above valve seat 83 and indicated at 86 is of greater diameter than that portion of the inner face of part 78 below seat 83.

There is associated with the intake element provided by the casting 77 a float controlled intake valve mechanism 87 comprising a valve stem 88 extending through the opening 29 in the guide 27 and into the portion 86 of the inner face of part 78 of casting 77 and across groove 82. The lower end of stem 88 merges into the upper end of a beveled valve head 89. The stem 68 intermediate its ends has mounted thereon a vertically adjustable setting device 90 for a pressure applying means, to be referred to for the valve head 89. The device 90 is of sleeve-like form and consists of upper and lower portions 90ᵃ, 90ᵇ and a reduced intermediate portion 91. The portion 90ᵇ constitutes a support or an abutment for a purpose to be referred to. The device 90 is secured stationary in its adjusted position by a set screw 92 carried by the portion 90ᵃ and binding against stem 88. Fixed to the stem 88 below and in proximity to the leg 28 of guide 27 is an arm 93, operated by a means to be referred to for rotating the stem.

Arranged within the chamber 7 is a vertically movable outer or primary float element 94 consisting of a hollow closed annulus 95. Positioned within and encompassed by the element 94 in spaced relation is an inner or secondary float element 96 consisting of a hollow closed cylindrical body 97 fixedly secured to a vertically disposed guide rod 98 axially of and extending above and depending below body 97. The lower end of rod 98 is slidably mounted in opening 9, sleeve 10 and socket 24.

Fixedly secured to the outer face of and bodily carried with float element 94 is a horizontally disposed hinge member 99 of yoke-shaped form having its sides 100 provided with aligned openings 101. The member 99 forms a part of a pressure exerting structure or means for valve 89, and such structure not only includes the member 99, but it also includes a spring controlled float actuated tiltable pressure applicator 102 comprising a channel-shaped part 103, a depending rearwardly inclined tapered abutment 104 at the inner end of the bottom, and forwardly of the inner ends of the sides of part 103. The latter has each of its sides formed with spaced horizontally aligned openings 105 and 106 and the outer end portion 107 of each of its sides of circular contour. The sides of end portions 107, straddle the device 90 and the lower edge parts of said portions 107 seat on the portion 90b of device 90. The upper edge parts of the portions 107 bear against the bottom of portion 90a of device 90. The rear ends of the sides of part 103 are preferably connected to the member 99 by a pin 108 extending through the aligning openings 101 in the sides 100 of member 99 and also through the openings 106 in the sides of part 103. The abutment 104 has a vertical lower end portion 109 which bears against element 94. Extending through the aligned openings 105 of the sides of part 103 is a pivot pin 110 which has one end seated in a socketed boss 111 secured on the inner face of the wall 14, and its other end extending through a boss 111a formed on the wall 15 (Figure 5). The wall 15 is provided with a peripherally threaded cutout 111b with which engages a peripherally threaded retainer 111c for pin 110. The retainer 111c has a socket 111d for receiving the end terminal portion 111e of pin 110. The outer terminal portions of the sides of part 103 are inset (Figure 3). Surrounding the pin 108 between the sides of member 99 is a coiled controlling spring 112 for the applicator 102. One end of spring 112 is extended as at 113 and bears against the element 94. The other end 114 of spring 112 is extended and mounted on pin 110. The spring 112 normally tends to provide for the outer end portions 107 of the sides of part 103 to bear on the flange or support 90 to force valve head 89 against its seat 83.

Fixed to and extending above the element 94 (Figure 9) is a bracket 113a having its upper end in the form of an angularly disposed loop 114a. The arm 93 of stem 88 is connected to the looped end 114a of bracket 113a by a yoke-shaped link 115 to provide for rotating stem 88 on the tilting of element 94. Arranged within the upper portion of the chamber 7 diametrically thereof, as well as extending into the chamber 8 is a support 116 (Figures 8 to 11) in which is slidably mounted a spring controlled articulated actuating mechanism 117 for a valve stem pounder or hammer element 118. The support 116 includes a horizontally disposed inverted channel shaped member 119 formed at one end with a pair of oppositely extending apertured flanges 120 which abut against and are anchored against the inner face of part 2 of housing 1. The top 121 of member 119 is cut out intermediate its ends as at 122. The sides 123 of member 119 are formed with aligning slots 124 lengthwise thereof and a pair of aligning openings 125. One of the sides of the member 119 has integral with its bottom edge a depending L-shaped bracket 126 which is disposed in spaced relation with respect to the slots 124 and openings 126. The member 119 at the other end thereof has formed integral with its top 121, a horizontally disposed T-shaped extension 127 having its head provided with a pair of depending apertured flanges 128 which are secured against the inner faces of walls 14, 15 of part 3 of housing 1 by the holdfast devices 129.

The actuating mechanism 117 for the pounder or hammer 118 consists of a pair of oppositely extending links 130, 131. The link 130 is of greater length than link 131, is bifurcated at one end, as at 133, and its other end formed with a lug 134. The link 130 between its transverse median and its bifurcated end 133 is provided with a transverse opening 135. The link 131 at one end is bifurcated, as at 136, into which extends the lug 134 of link 130. The end 136 of link 131 is pivotally connected to the lug 134 by the pivot pin 139. The link 131 at its other end is provided with a transverse opening 140 which aligns with the slots 124. Extending through the opening 140 and slots 124, as well as being fixed to link 131 and extended from the sides 123 of member 119 is an anchoring pin 141 for a purpose to be referred to. Fixed in the openings 126 of the sides 123 of member 119 and extending through the opening 135 of link 130 is a pin 142 which constitutes a pivot for said link 130. The end 133 of link 130 is formed with aligned openings 143 for the passage of a combined pivot forming and anchoring pin 144 which extends laterally in opposite directions to the stem of the extension 127. Connected at one end thereof to the anchoring pin 141, is a pair of controlling springs 145 for and which form elements of the actuating mechanism 117. The other ends of the springs 145 are anchored to the pin 144. The mechanism 117 not only constitutes an actuator for the pounder 118, but also a latching means for the latter. The element 118 not only provides a pounder or hammer for valve stem 88, but also a setting means for mechanism 117.

The pounder or hammer element 118 is in the form of a flat bar 146 arranged over the upper end of valve stem 88, extends through notch 17 and has its inner end extended into the bifurcated end 133 of link 130 and is loosely mounted on the pin 144. A transverse opening 147 is provided at the inner end of bar 146 for mounting it on the pin 144.

The bracket 126 on one of the sides 123 of member 119 has its horizontal arm formed with an opening 148 for the passage of the guide rod or bar 98 of the float 96. The rod 98 also functions as a trip for the mechanism 117.

A boiler is indicated generally at 149 and it includes a tank 150 and a jacket 151. Supporting legs 152, only one shown, are provided for the boiler. Connected to the latter is a confined thermostatic structure 153 of known construction from which leads a controlling means, not shown for and which is to be attached to the stem 54 of mechanism 33. It may be that the bracket 25 is required to be attached to the boiler 149 at a point whereby opening 11 in bottom member 4 will be so positioned relative to the thermostatic structure 153 that the stem 54 will not be below the latter. To overcome this objection and to provide for housing 32 to be coupled to other points of the bottom member 4 to position the housing 32 to align with the controlling means for valve stem 54, the bottom member 4 is formed with normally closed spaced openings 154 for selectively connecting therewith the tubular coupling 37 for the branch 40 of the housing 32.

With respect to the operation of the device, the oil enters into float chamber 7 from the chamber 8 on the entrance of the oil in chamber 8 through the port 84 when the valve 89 is off of its seat 83. The oil in the chamber 7 is kept at a constant level by the float 94 acting on applicator 102 to normally force valve 89 down on its seat 83 against the action of the incoming oil. The float 94 is hinged to the applicator 102 as stated aforesaid. The float 94 opposes the depending abutment 104 of the applicator 102 whereby the abutment 104 is pressed against float 104 by the spring 112. The float 96 and its guide rod 98, as well as mechanism 117 is in normal position as shown in Figs. 2 and 3. If foreign matter becomes lodged on the valve 89 or on the seat 83 of the latter, on the rise of the float 94 it tips up and compresses spring 112 and on a compression of the spring 112 the force on the valve 89 increases and which is on valve 89 due to the arrangement of the applicator 102 relative to the supporting means 90 carried by stem 88. The purpose of the spring 112 is, along with the pivot 101, to provide a resilient lost motion connection between the float 94 and valve 89 so that upon relative movement therebetween, the bracket 113a, link 115 and arm 93 will rotate the valve 89 slightly. The rotative motion of stem 89 will overcome substantially 95% of the unnecessary tripping in regular or conventional valves. If the increased pressure on valve 89 and the rotative motion of stem 88 fail to seat the valve 89, the rising of the oil elevates float 96 carrying its guide rod 98 therewith until the latter engages mechanism 177 whereby the latter will assume the position shown in Figures 8 and 9. Prior to the actuation of the mechanism 177 by the guide rod, the links are aligned horizontally thereby placing springs 145 under tension. When the inner connected ends of the links are raised or positioned off center, the springs 145 will be released causing the links to assume the position shown in Figures 8 and 9, lowering the inner end of pounder 118 and actuating the latter in a manner to impart a blow on stem 88 which results in the lowering of valve 89 to a positive cut-off position. After excess oil has been consumed, the valve 89 may be reset by pressing downwardly on the extended end of pounder 118 without dumping out the oil. A manual shut-off may be had relative to valve 89 by raising the extended portion of the pounder 118. The valve seat 83 on element 77 is positioned above the bottom of the chamber 8 so that incoming particles carried by the oil may either float away or settle to the bottom of the chambers and reduce the fouling of the valve seat 83 to a minimum.

What I claim is:

1. In a safety control and oil leveling valve structure, a housing providing a float chamber and an intake valve chamber opening into the float chamber, a vertically disposed tubular oil intake element in said intake chamber formed with an intake valve seat and a discharge port, a tiltable float operating in the float chamber, an intake valve coacting with said seat for shutting off the intake of oil through said port, a guide for and disposed at the upper portion of said valve, a horizontally disposed link loosely connected at one end to and eccentrically of said valve adjacent said guide and loosely connected at its other end with the upper portion of the float, and a float actuated pressure exerting structure urging said valve to seat at normal oil level, bearing against the float and including correlated parts forming a resilient lost motion connection between the float and valve to permit of the tilting of the float, on the rise of the oil above said normal level whereby on the tilting of the float said link will act to rotate the valve on its seat to wipe the latter.

2. In a safety control and oil leveling valve structure, a housing providing a float chamber and an intake valve chamber opening into the float chamber, a vertically disposed tubular oil intake element in said intake chamber formed with an intake valve seat and a discharge port, a tiltable float operating in the float chamber, an intake valve coacting with said seat for shutting off the intake of oil through said port, a guide for and disposed at the upper portion of said valve, a horizontally disposed link loosely connected at one end to and eccentrically of said valve adjacent said guide and loosely connected at its other end with the upper portion of the float, a float actuated pressure exerting structure urging said valve to seat at normal oil level, bearing against the float and including correlated parts forming a resilient lost motion connection between the float and valve to permit of the tilting of the float, on the rise of the oil above said normal level whereby on the tilting of the float said link will act to rotate the valve on its seat to wipe the latter, said valve being formed with a stem, and said pressure exerting structure including means for adjustably connecting it to and lengthwise of said stem.

3. In a valve structure for the purpose set forth, a housing providing a float chamber and an intake chamber opening into the float chamber, said intake chamber being provided with an intake valve seat, a tiltable float operating in the float chamber, an intake valve coacting with said seat for shutting off the intake of oil, a guide for and disposed at the upper portion of said valve, a horizontally disposed link loosely connected at one end to and eccentrically of said valve adjacent said guide and loosely connected at its other end with the upper portion of the float, and a float actuated pressure exerting structure urging said valve to its seat at normal oil level, bearing against said float and including correlated parts forming a resilient lost motion connection between the float and valve to permit of the tilting of the float on the rise of the oil above said normal level whereby on the tilting of the float, said link will act to rotate the valve on its seat to wipe the latter.

4. In a valve structure for the purpose set forth, a housing providing a float chamber and an intake chamber opening into the float chamber, said intake chamber being provided with an intake valve seat, a tiltable float operating in the float chamber, an intake valve coacting with said seat for shutting off the intake of oil, a guide for and disposed at the upper portion of said valve, a horizontally disposed link loosely connected at one end to and eccentrically of said valve adjacent said guide and loosely connected at its other end with the upper portion of the float, a float actuated pressure exerting structure urging said valve to its seat at normal oil level, bearing against said float and including correlated parts forming a resilient lost motion connection between the float and valve to permit of the tilting of the float on the rise of the oil above said normal level whereby on the tilting of the float said link will act to rotate the valve on its seat to wipe the latter, said valve being formed with a stem, said pressure exerting structure including means for adjustably connecting it to and lengthwise of the stem, and said link being connected to the stem above the point of connection between said means and stem.

5. In a valve structure for the purpose set forth, a housing providing a float chamber and an oil intake chamber opening into the float chamber, said intake chamber being provided with an intake valve seat, an intake valve for correlation with said seat to close intake of oil to the intake chamber and formed with a vertical stem, a guide in the intake chamber for said stem, a normally inactive hammer for coaction with the stem to pound the valve on said seat, said hammer arranged in the upper portion of said chambers and disposed over the stem, a float in said float chamber, a vertical guide rod for, bodily moving with, depending below and extending above the float, and a normally latched articulated spring controlled actuating mechanism for said hammer including a pair of tandemwise arranged sections interengaging and pivotally connected together at their opposed ends, one of the said sections being of greater length than the other, pivotally connected at its other end to one end of the hammer and pivotally supported intermediate its ends in the upper portion of the float chamber, the said other of said sections being slidably supported at the other end thereof in the upper section of the float chamber and disposed over and in the path of said rod whereby the latter, upon abnormal rise of oil level will release said mechanism to make the hammer active, the spring-controlling means for said mechanism being connected to the said other ends of said sections.

GEORGE W. WHITEHURST.